(No Model.)

C. R. HUNT & T. D. BALL.
TRUCK.

No. 466,073. Patented Dec. 29, 1891.

Witnesses,

Inventors,
Charles R Hunt
Thomas D. Ball

UNITED STATES PATENT OFFICE.

CHARLES R. HUNT AND THOMAS D. BALL, OF WINTERS, CALIFORNIA.

TRUCK.

SPECIFICATION forming part of Letters Patent No. 466,073, dated December 29, 1891.

Application filed August 28, 1891. Serial No. 404,017. (No model.)

*To all whom it may concern:*

Be it known that we, CHARLES R. HUNT and THOMAS D. BALL, citizens of the United States, residing at Winters, Yolo county, State of California, have invented an Improvement in Vehicle-Loaders; and we hereby declare the following to be a full, clear, and exact description of the same.

Our invention relates to that class of vehicles which are provided with mechanical power devices for facilitating the loading thereof.

Our invention consists, in connection with a vehicle, of an independent movable frame thereon, and rollers interposed which bear and travel on inclined planes, whereby through the movement of the frame it is lifted and lowered by the rollers.

The object of our invention is to provide simple, easily-operated, and powerful means for lifting a load from a fixed stand on which it is preliminarily placed and transferring it to and bearing it upon a vehicle by which it can be transported.

Figure 1:
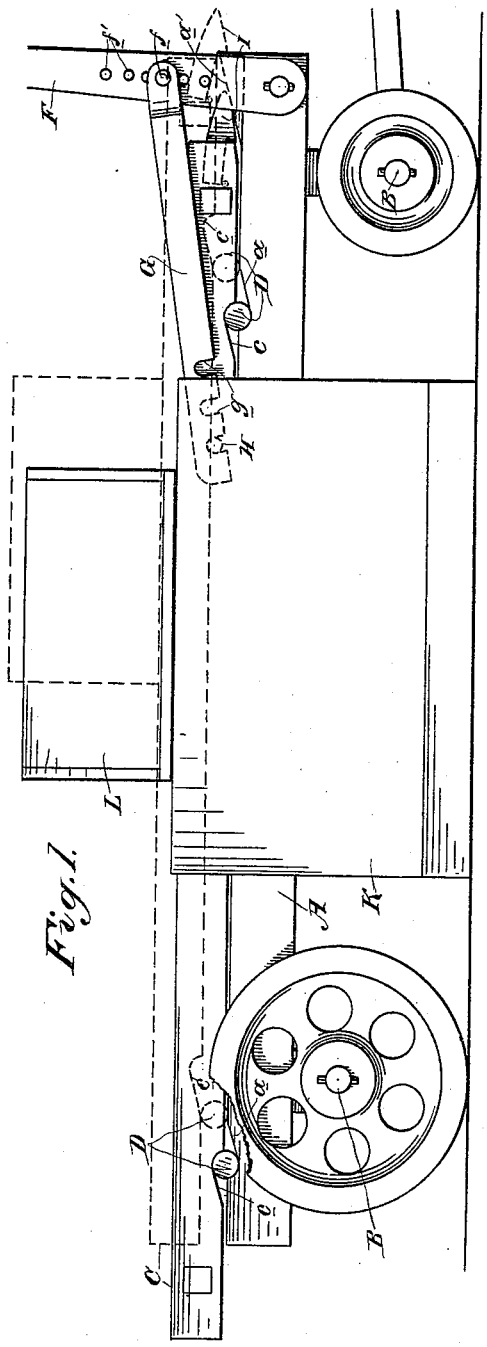
Figure 2:
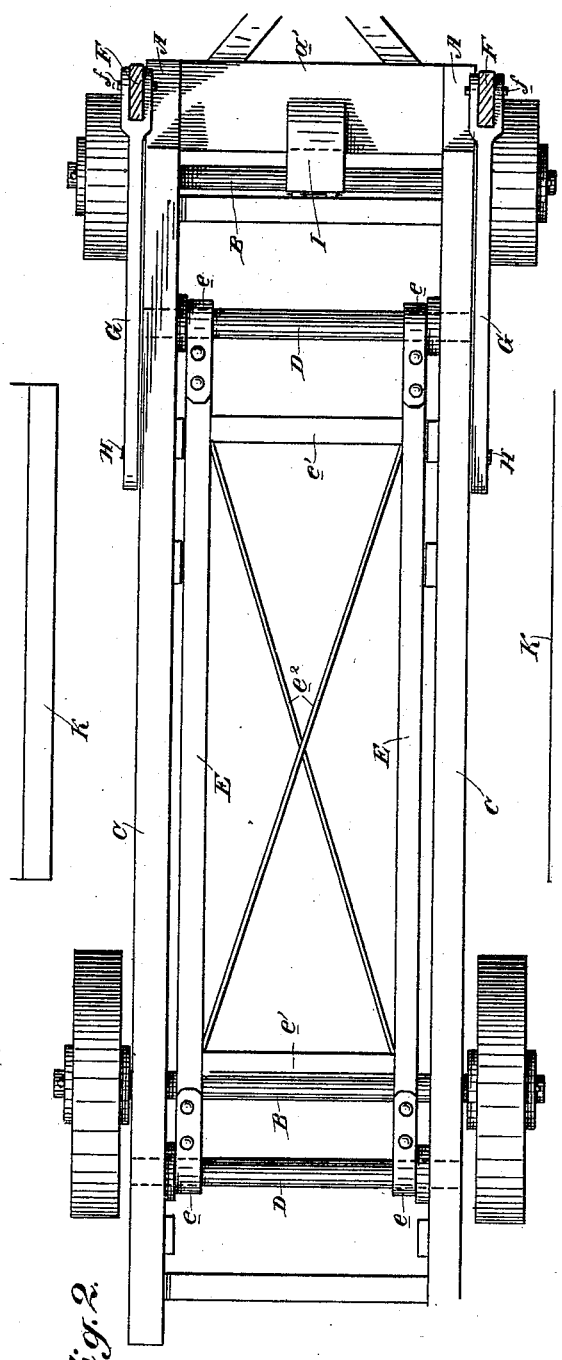

Referring to the accompanying drawings for a more complete explanation of our invention, Figure 1 is a side elevation of our loading-wagon, showing it in position ready to take a load. Fig. 2 is a plan of our wagon.

The frame of the vehicle has the usual side sills A, said frame being mounted upon the wheeled axles B.

Upon top of the frame of the vehicle and resting upon its side sills thereof is the independent frame C.

D are rollers in any suitable number, here shown as one at the front and one at the rear of the vehicle. These rollers extend transversely of the vehicle-frame, and their ends rest upon the side sills A. The bearings or tracks in which the rollers are adapted to travel are forwardly-inclined planes $a$, formed in the sills. The sides of the lifting-frame C rest upon these rollers, and their under surfaces are provided with backwardly-inclined planes $c$. These rollers may be entirely independent of each other; but they are preferably connected by a suitable frame, so that they will be guided in their movements and work in unison and true. This frame may be of any suitable character, such as is here shown by the longitudinal pieces E, provided with end bearings $e$, in which the rollers are carried, cross-strips $e'$, and diagonal brace-rods $e^2$. Pivoted to the forward ends of the sills A of the frame are the operating-levers F, to which are connected the rods G, the connection being formed by the forked forward ends of said rods embracing the lower ends of the levers and secured thereto adjustably by means of a pin or bolt $f$, adapted to be inserted through any of a series of holes $f'$ in said levers. This adjustment provides for obtaining the requisite leverage, according to the power to be exerted. The rear ends of these connecting-rods are adapted to engage studs or pins H, secured to the sides of the lifting-frame. This connection may be an adjustable one by means of a series of notches $g$ in the connecting-rods, with any one of which the pins or studs are adapted to engage.

Hinged to the forward end of the lifting-frame is a latch I, which plays over and is adapted to engage the forward edge of a cross-bar $a'$, extending between the forward ends of the side sills A.

The operation of our vehicle is as follows: Upon a convenient stand or support consisting of separated side frames, such as are represented by K, the load L is placed transversely. The height of these frames is such as to raise the load sufficiently to permit the vehicle to be backed under it and between the side supporting-frames. When the wagon is thus in position, its lifting-frame is back to its limit, and is therefore as low down as it can get. In this position it will pass under the load. Now when the wagon or vehicle is under the load the operating-levers are drawn forwardly, whereby the lifting-frame is drawn forwardly by means of the connecting-rods. As this frame rests upon the rollers, these rollers themselves travel forwardly, and in this movement they rise on the inclined planes of the side sills A, while at the same time the lifting-frame itself rises by reason of its own inclined planes traveling on the rollers, so that by both movements the friction is reduced to a minimum, while the frame is bodily raised. In this rising of the frame it lifts the load clear of its side supports, carrying it upon itself. The vehicle is then drawn forwardly, and when clear of the side supports the levers may be thrown back and the lifting-frame allowed to descend with the load upon it to its normal place. While the lifting-frame is raised, it may be held in this position by means of the latch engaging the forward edge of the cross-bar. In the same manner the load may be taken from the vehicle and deposited upon suitable supports.

Having thus described our invention, what we claim as new, and desire to secure by Letters Patent, is—

1. In combination with the frame of a vehicle having side sills provided with inclined planes upon their upper surfaces, a superposed independent movable frame, rollers mounted upon the side sills of the vehicle-frame and adapted to travel in the inclined planes thereof, said rollers supporting the independent frame, and power connections for moving said frame to cause the rollers to travel on the inclined planes, whereby said frame is lifted bodily, substantially as herein described.

2. In combination with the frame of a vehicle having side sills provided with inclined planes on their upper surfaces, a superposed independent movable frame provided with inclined planes on the under surfaces of its side pieces, rollers interposed between the side pieces of the two frames and mounted and adapted to travel in the inclined planes thereof, and power connections for moving said independent frame to effect the travel of the rollers, whereby said frame is lifted bodily, substantially as herein described.

3. In combination with the vehicle-frame having the side sills with inclined planes, the superposed movable independent frame having the inclined planes, the rollers interposed between said frames and mounted and adapted to travel in the inclined planes thereof, the power-levers pivoted to the vehicle-frame, and the rods connecting said power-levers with the independent movable frame, whereby said frame is moved to effect the travel of the rollers and its consequent elevation, substantially as herein described.

4. In combination with the vehicle-frame having the side sills with inclined planes, the superposed movable independent frame having the inclined planes, the rollers interposed between said frames and mounted and adapted to travel in the inclined planes thereof, the power-levers pivoted to the vehicle-frame, the rods connecting said power-levers with the independent movable frame, whereby said frame is moved to effect the travel of the rollers and its consequent elevation, the latch on the forward end of the movable frame, and the crossbar on the vehicle-frame, with which said latch engages, substantially as herein described.

5. In combination with the frame of a vehicle having side sills provided with the inclined planes, the superposed independent movable frame having the inclined planes on the under surface of its sides, the rollers interposed between said frames and mounted and adapted to travel on the inclined planes thereof, the frame-work connecting the rollers, whereby they are guided, and the levers and connecting-rods by which the movable frame is operated, substantially as and for the purpose herein described.

In witness whereof we have hereunto set our hands.

CHARLES R. HUNT.
THOMAS D. BALL.

Witnesses:
S. H. NOURSE,
J. A. BAYLESS.